(12) United States Patent
Wheeler et al.

(10) Patent No.: US 7,748,184 B1
(45) Date of Patent: Jul. 6, 2010

(54) BODY PANEL HAVING IMPROVED STIFFNESS AND METHOD OF MAKING

(75) Inventors: Maurice E. Wheeler, Mentor, OH (US); Bradley D. McDonel, Cleveland, OH (US)

(73) Assignee: Intellectual Property Holdings, LLC, Cleveland, OH (US)

( * ) Notice: Subject to any disclaimer, the term of this patent is extended or adjusted under 35 U.S.C. 154(b) by 1185 days.

(21) Appl. No.: 11/350,334

(22) Filed: Feb. 8, 2006

Related U.S. Application Data

(60) Provisional application No. 60/651,421, filed on Feb. 9, 2005.

(51) Int. Cl.
*E04C 1/00* (2006.01)
*B32B 27/00* (2006.01)

(52) U.S. Cl. .................. 52/309.1; 52/309.3; 428/411.1; 428/423.1

(58) Field of Classification Search .............. 428/411.1, 428/423.1; 52/309.1, 309.3
See application file for complete search history.

(56) References Cited

U.S. PATENT DOCUMENTS

| | | | |
|---|---|---|---|
| 3,740,353 | A | 6/1973 | Patrick et al. |
| 3,770,560 | A | 11/1973 | Elder et al. |
| 3,894,169 | A | 7/1975 | Miller |
| 4,099,590 | A | 7/1978 | Martin, Sr. |
| 4,118,258 | A | 10/1978 | Graveron et al. |
| 4,133,932 | A | 1/1979 | Peck |
| 4,191,798 | A | 3/1980 | Schumacher et al. |
| 4,311,751 | A | 1/1982 | Brueggemann et al. |
| 4,374,172 | A | 2/1983 | Schwarz et al. |
| 4,438,166 | A | 3/1984 | Gluck et al. |
| 4,456,705 | A | 6/1984 | McCarthy |

(Continued)

FOREIGN PATENT DOCUMENTS

DE     3800740     8/1989

(Continued)

OTHER PUBLICATIONS

"Anti Damping and Thermoplastic Elastmer VS-POLYMER", Kuraray Co., Ltd. Tokyo, Japan, Aug. 1993, pp. -15.

(Continued)

*Primary Examiner*—Thao T. Tran
(74) *Attorney, Agent, or Firm*—Pearne & Gordon LLP

(57) ABSTRACT

A damping system includes a base substrate, a constraining substrate and a non-foam damping layer between them. The base substrate has greater lateral dimensions than the constraining substrate. Consequently, the damping system is provided in a localized region of the base substrate. The damping system can be provided, for example, at a region of the base substrate where a longitudinal projection or moving linkage extends through an opening in the base substrate, such as a steering column through a dashboard panel. In this embodiment, a composite opening is provided through the damping system to accommodate the extending projection or linkage, and the damping system is effective to provide localized damping against vibrations due to the through-the-panel linkage. The damping system provides these benefits without increasing the overall thickness of the body part, and without providing damping and constraining layers across its entire lateral expanse, saving cost and weight. Methods of making such a damping system are also provided.

21 Claims, 2 Drawing Sheets

U.S. PATENT DOCUMENTS

| | | | |
|---|---|---|---|
| 4,468,499 A | 8/1984 | Siegfried et al. | |
| 4,482,414 A | 11/1984 | Schonberger | |
| 4,495,240 A | 1/1985 | McCarthy | |
| 4,511,679 A | 4/1985 | Ariyoshi et al. | |
| 4,584,232 A | 4/1986 | Frank et al. | |
| 4,636,425 A | 1/1987 | Johnson et al. | |
| 4,709,781 A | 12/1987 | Scherzer | |
| 4,719,247 A * | 1/1988 | Lin et al. | 521/159 |
| 4,734,323 A | 3/1988 | Sato et al. | |
| 4,740,427 A | 4/1988 | Ochiumi et al. | |
| 4,766,028 A | 8/1988 | Rich | |
| 4,769,271 A | 9/1988 | Sekimoto | |
| 4,781,774 A | 11/1988 | Steward et al. | |
| 4,800,984 A | 1/1989 | Kerman | |
| 4,803,105 A | 2/1989 | Kretow et al. | |
| 4,823,909 A | 4/1989 | Nakamura et al. | |
| 4,830,908 A | 5/1989 | Nakajima et al. | |
| 4,842,938 A | 6/1989 | Rizk et al. | |
| 4,851,271 A | 7/1989 | Moore, III et al. | |
| 4,860,851 A * | 8/1989 | Krevor et al. | 181/207 |
| 4,883,717 A | 11/1989 | Kitamura et al. | |
| 4,887,788 A | 12/1989 | Fischer et al. | |
| 4,906,501 A | 3/1990 | Honma et al. | |
| 4,938,819 A | 7/1990 | Ishii et al. | |
| 4,966,799 A | 10/1990 | Lucca et al. | |
| 4,987,194 A | 1/1991 | Maeda et al. | |
| 5,008,324 A | 4/1991 | Killgoar, Jr. et al. | |
| 5,021,108 A | 6/1991 | Bergqvist | |
| 5,063,253 A | 11/1991 | Gansen et al. | |
| 5,066,708 A | 11/1991 | Koller, Sr. et al. | |
| 5,094,318 A | 3/1992 | Maeda et al. | |
| 5,114,755 A | 5/1992 | Canaday et al. | |
| 5,129,975 A | 7/1992 | Easterle et al. | |
| 5,143,755 A | 9/1992 | Moore, III et al. | |
| 5,160,783 A | 11/1992 | Nemoto et al. | |
| 5,162,156 A | 11/1992 | Troughton, Jr. et al. | |
| 5,190,986 A | 3/1993 | Allen et al. | |
| 5,196,253 A | 3/1993 | Mueller et al. | |
| 5,213,879 A | 5/1993 | Niwa et al. | |
| 5,245,141 A | 9/1993 | Fortez et al. | |
| 5,266,143 A | 11/1993 | Albera et al. | |
| 5,266,374 A | 11/1993 | Ogata | |
| 5,271,612 A | 12/1993 | Yada et al. | |
| 5,271,879 A | 12/1993 | Saatchi et al. | |
| 5,300,355 A | 4/1994 | Mifune et al. | |
| 5,318,837 A | 6/1994 | Yoshinaka et al. | |
| 5,350,610 A | 9/1994 | Mashita et al. | |
| 5,473,122 A | 12/1995 | Kodiyalam et al. | |
| 5,487,928 A | 1/1996 | Fujimoto | |
| 5,493,081 A | 2/1996 | Manigold | |
| 5,536,556 A | 7/1996 | Juriga | |
| 5,562,791 A | 10/1996 | De Groot | |
| 5,567,922 A | 10/1996 | Schmuck et al. | |
| 5,578,800 A | 11/1996 | Kijima | |
| 5,635,562 A | 6/1997 | Malcolm | |
| 5,858,521 A | 1/1999 | Okuda et al. | |
| 5,895,013 A | 4/1999 | Towfiq | |
| 5,908,591 A | 6/1999 | Lewit et al. | |
| 5,928,772 A | 7/1999 | Shiraishi et al. | |
| 5,945,643 A | 8/1999 | Casser | |
| RE36,323 E | 10/1999 | Thompson et al. | |
| 6,066,580 A | 5/2000 | Yoshida et al. | |
| 6,096,416 A | 8/2000 | Altenberg | |
| 6,110,985 A | 8/2000 | Wheller | |
| 6,123,171 A | 9/2000 | McNett et al. | |
| 6,123,172 A | 9/2000 | Byrd et al. | |
| 6,130,284 A | 10/2000 | Singh | |
| 6,279,229 B1 | 8/2001 | Lemke et al. | |
| 6,288,133 B1 | 9/2001 | Hagquist | |
| 6,290,021 B1 | 9/2001 | Strandgaard | |
| 6,309,985 B1 | 10/2001 | Virnelson et al. | |
| 6,316,514 B1 | 11/2001 | Falke et al. | |
| 6,337,356 B1 | 1/2002 | Zaschke et al. | |
| 6,391,438 B1 | 5/2002 | Ramesh et al. | |
| 6,497,947 B1 | 12/2002 | Blais et al. | |
| 6,524,691 B2 | 2/2003 | Sugawara et al. | |
| 6,550,868 B2 | 4/2003 | Kobayashi et al. | |
| 6,554,101 B2 | 4/2003 | Watanabe et al. | |
| 6,555,246 B1 | 4/2003 | Zwick | |
| 6,623,674 B1 | 9/2003 | Gehlsen et al. | |
| 2004/0247857 A1 | 12/2004 | Schroeder | |

FOREIGN PATENT DOCUMENTS

| | | |
|---|---|---|
| EP | 636517 | 2/1995 |
| EP | 680866 | 11/1995 |
| GB | 2216081 | 10/1989 |
| GB | 1287606 | 4/2005 |
| WO | 98/18657 | 5/1998 |

OTHER PUBLICATIONS

"Damping and Thermoplastic Rubber VS-POLYMER", Kuraray Co., Ltd., Tokyo, Japan, Aug. 1995, pp. 1-15.

"HYBRAR-New TPE with Vibration Damping Effect", Kuraray Co., Ltd., Tokyo, Japan, Mar. 11, 1993, pp. 1-14.

Kirk-Othmer, "Concise Encyclopedia of Chemical Technology", John Wiley & Sons, Inc., 1985, pp. 518-521.

Buck, Kevin A., "New Developments in Molded Polyurethane for sound Insulation applications", Document No. 2001-01-1555, presented at S.A.E. Noise and Vibration Conference and Exposition, Apr. 2001.

Park, Chung P. et al., "Novel Acoustical Polyolefin Foams", Document No. 2001-01-1556, presented at S.A.E. Noise and Vibration Conference and Exposition, Apr. 2001.

* cited by examiner

BODY PANEL HAVING IMPROVED STIFFNESS AND METHOD OF MAKING

This application claims the benefit of U.S. Provisional Patent Application No. 60/651,421 filed Feb. 9, 2005, the contents of which are incorporated herein by reference in their entirety.

FIELD OF THE INVENTION

The invention relates generally to a damping system for reducing vibration in passenger vehicles and more particularly to a damping system that is effective to stiffen a passenger vehicle body part at a localized location in order to reduce vibration and noise.

DESCRIPTION OF RELATED ART

Passenger vehicles such as automobiles generally generate much noise. Rotating transmission and axle linkages, high-speed and/or high-shear moving parts, rotating bearings and rotating tires contacting the road all create structural vibration and noise. Collectively, this vibration and noise can create uncomfortable conditions for the passengers. It is desirable to reduce the amount noise and vibration that enters the passenger cabin to improve the comfort of the passengers.

Generally, this can be done by blocking the noise from entering the cabin, by absorbing the noise that enters the cabin or by reducing the vibrations of the vehicle body parts surrounding the cabin. Reducing the vibration is preferred because often noise is simply the result of the vibration. Increasing body part stiffness, adding damping to the body part or adding weight can all reduce vibrations.

Vehicle body part stiffness is commonly achieved by using thicker pieces of material such as metal for the body part or welding a thicker material to the body part near the source of the vibration. However, thicker body parts increase cost and welding adds time and additional steps during assembly. Although the added weight of thicker body parts helps to reduce vibration, it is undesirable because it reduces fuel efficiency and wastes material.

SUMMARY OF THE INVENTION

A damping system is provided, including a vehicle body part as a base substrate, a non-foam vibration damping layer overlying and in contact with the base substrate, and a constraining substrate overlying and in contact with the damping layer. The base substrate has lateral dimensions greater than the constraining substrate.

A damping system is further provided, including a metal vehicle body part having a non-foam polyurethane damping layer having a thickness of 0.001-0.05 inches overlying and in substantially continuous contact with the vehicle body part. The damping layer has a loss factor of at least 0.09 for a vibration of 200 Hz at about 23° C.

A method for providing a vehicle body part having improved localized stiffness is also provided. The method includes the following steps: (a) providing a base substrate, a constraining substrate less than or equal to the thickness of said base substrate and a liquid, non-cured precursor composition for a non-foam damping layer, (b) providing the precursor composition directly onto a surface of the base substrate, and placing the constraining substrate over the surface of the base substrate so that said precursor composition is sandwiched in between and in contact with both the base and constraining substrates to produce a damping system, (c) passing the damping system through a constraining die in order to compress the damping system to a desired thickness, (d) curing, or allowing to cure, the liquid precursor composition to produce a fully cured non-foam damping layer in substantially continuous contact with and sandwiched between the constraining and base substrates, and (e) stamping the base substrate, having the damping system now integral therewith over a localized portion thereof, into the desired shape of a vehicle body part.

DETAILED DESCRIPTION OF PREFERRED EMBODIMENTS OF THE INVENTION

In the description that follows, when a preferred range such as 5 to 25 (or 5-25) is given, this means preferably at least 5 and, separately and independently, preferably not more than 25. As used herein, CRS stands for cold-rolled steel. Also as used herein, the index of the damping layer 16 refers to the stoichiometric ratio of polyol reactive sites to isocyanate reactive sites in a mixture for producing a polyurethane damping layer 16 as known in the art. An index of 100 indicates a stoichoiometrically-balanced proportion of polyol- to isocyanate-reactive sites. Thus, an index greater than 100 indicates a stoichiometric excess of isocyanate reactive sites and vice versa. This relation between the index value and the degree of excess (or shortage) of polyol or isocyanate reactive sites is known in the art. As used herein, a passenger vehicle can include, but is not limited to, a car, truck, all-terrain vehicle, tractor, mower, etc. As used herein, the vehicle body part can include, but is not limited to, a car door panel, dashboard panel, wheel hub panel, floor panel, hood panel, support brace or beam, etc.

Figure 1:
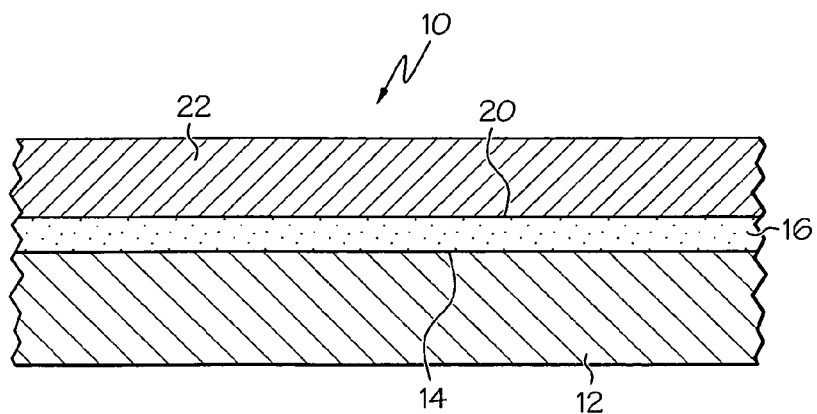
FIG. 1 shows diagrammatically a cross-section of a damping system 10 according to the present invention.

With reference to FIG. 1, there is shown a damping system 10 according to an embodiment of the invention. The system 10 has a damping layer 16, a base substrate 12 and a constraining substrate 22 as shown. Preferably, the damping layer 16 is applied directly to and in contact with the bottom surface 20 (surface facing the layer 16) of the constraining substrate 22. The damping layer 16 is thus formed integrally on and adhered to the surface 20 of the constraining substrate 22. The contact between the constraining substrate 22 and damping layer 16 is preferably continuous and uninterrupted with no interfacial layer or adhesive material between them. Once the damping layer 16 is applied to the constraining substrate 22, the top surface 14 (surface facing the layer 16) of the base substrate 12 is brought into contact with the damping layer 16, which is already adhered to the constraining substrate 22, to form the damping system 10. As will be appreciated and made apparent, the base substrate 12 is the panel or structure of a vehicle body whose vibration is to be damped.

Alternatively, the damping layer 16 is applied directly to the top surface 14 of the base substrate 12 in a manner that the layer 16 is formed integrally on and adhered to the surface 14. The constraining substrate 22 is also brought into contact with the damping layer 16. In this embodiment, the layer 16 is also preferably formed integrally to and adhered to the surface of the constraining substrate 22. There is preferably no interfacial layer or adhesive material between the damping layer 16 and the substrates 12, 22.

With reference to FIG. 1, the constraining substrate 22 has a smaller size than the underlying base substrate 12 in terms of lateral dimensions. Herein, 'lateral dimension' refers to a dimension along the surface expanse of a layer or substrate 12, 22, which can be planar or follow a curved surface contour whose tangent is generally orthogonal to the thickness dimension at any given point in the layer or substrate. The ratio of the constraining substrate 22 surface area to the base substrate 12 surface area (over their adjacent faces) is preferably 0.1-0.5, preferably 0.15-0.4 or about 0.2, 0.25, 0.3 or 0.2-0.3.

In one embodiment, the base substrate 12 is made or stamped from a vehicle body part blank such as a dashboard panel or wheel well blank. A 'blank' is defined as a piece that has not been stamped (i.e. pre-stamped) or formed into the final desired shape or contour for the finished body part. Preferably, the body part blank does not yet have an opening or aperature such as a steering column or axle rod opening. The appropriate damping system 10 is provided by assembling the damping layer 16 and constraining substrate 22 mentioned above at the desired location on the surface of the body part substrate 12 blank. As explained with respect to FIGS. 2 and 3 below, the damping system 10 is particularly desirable to damp vibrations associated with through-the-panel linkages or moving structures such as a steering column through a dashboard panel, etc. The location for forming the damping system 10 can be advantageously selected to correspond to a location where a hole or opening 30 to accommodate such structures will be provided (See FIG. 2). In that case, the lateral dimensions of the constraining substrate 22 and damping layer 16 (which are preferably co-extensive) will be at least sufficient to accommodate the lateral dimensions of the opening 30 to be made through the base substrate 12 body part. Once the constraining substrate 22 and damping layer 16 have been assembled to the body part substrate 12 blank to provide the damping system 10 at the desired location, the body part blank and integral damping system 10 can be stamped into the desired vehicle body part shape by a press or other conventional machines as known in the art. If desired, an opening can be punched in the stamped vehicle body part, e.g. at the location of the damping system 10, in order to accommodate longitudinally extensive components generally known in the art such as steering columns that must extend through a vehicle body part. The pre-stamped damping system 10 of this embodiment provides easy handling and shipping of the vehicle body parts prior to punching.

Figure 2:
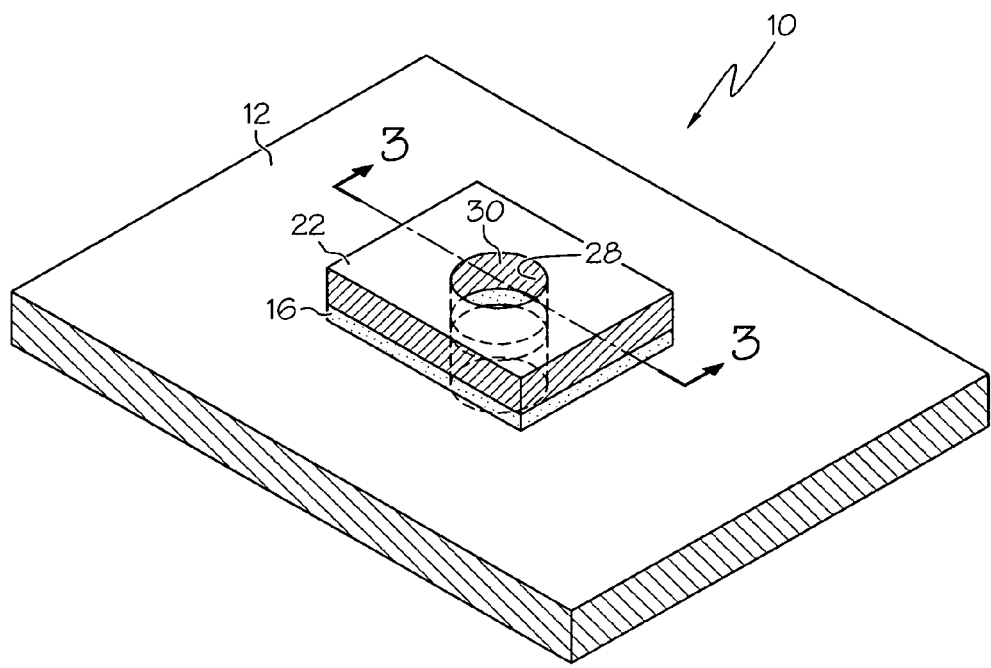
FIG. 2 shows diagrammatically a damping system 10 according to a one embodiment of the present invention.
Figure 3:
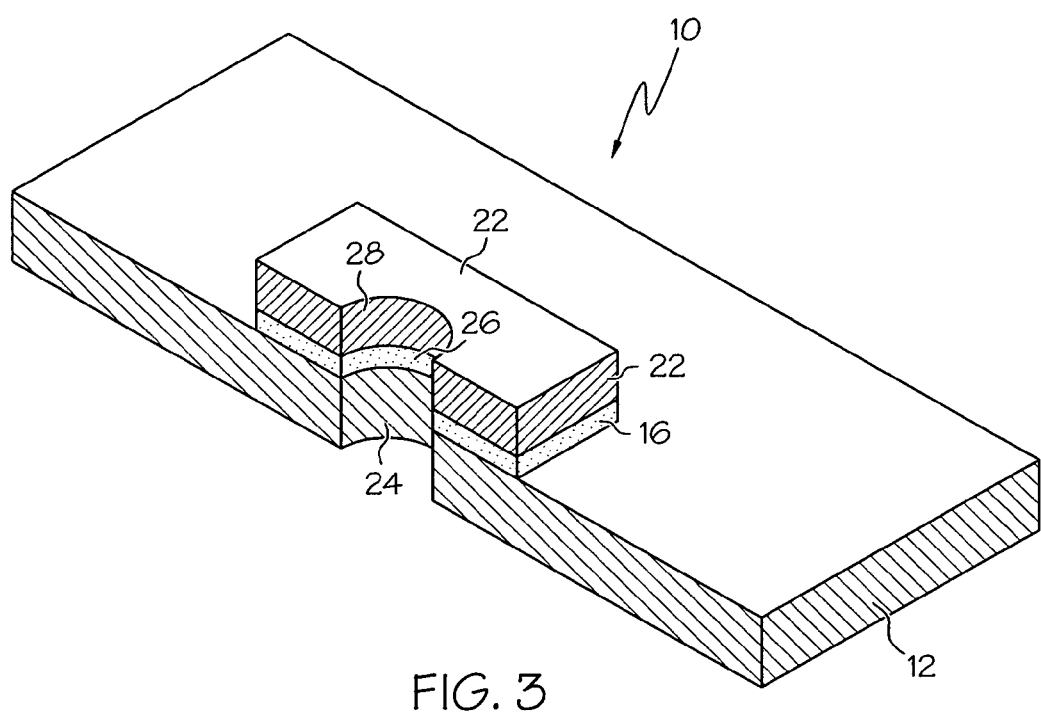
FIG. 3 shows a cross-sectional view of the damping system 10 taken along line 3-3 in FIG. 2.

With reference to FIGS. 2 and 3, the base substrate 12 is preferably a vehicle body part of any shape or contour as may be desired. The vehicle body part 12 can include at least one opening or aperature 24. Examples include a dashboard panel with an opening to accommodate a steering column or a wheel well panel containing an opening for an axle rod. The opening 24 in the base substrate 12 can be any shape or size that may be desirable. Preferably, the constraining substrate 22 has a smaller size than the underlying base substrate 12 in terms of lateral dimensions and has at least one opening 28 that is approximately the same shape and size as the opening 24 in the base substrate 12. As shown in FIGS. 2 and 3, the constraining substrate 22 is provided and aligned overlying the base substrate 12 with the damping layer 16 between them, so the opening 28 is aligned and positioned substantially in register with the opening 24. The opening 26 is also provided in the damping layer 16, having substantially the same shape and size as the openings 24 and 28, and being in register therewith. The registered openings 24, 26 and 28 together cooperate and define a composite opening 30 that extends entirely through the resulting system 10. This composite opening 30 can accommodate longitudinally extensive components generally known in the art such as steering columns that must extend through a vehicle body part such as the base substrate 12. The composite opening 30 can be made by punching through the fully assembled damping system 10 after the layers thereof are brought together as described above. Alternatively, each substrate 12, 22 can be pre-punched with the necessary opening and then the three layers assembled so that their respective openings are aligned and provided in register with one another.

Preferably, the damping layer 26 material does not substantially extend into the composite opening 30. More preferably, the damping layer 26 is flush with the edges of the openings in the substrates 24, 28. The damping layer 16 is preferably applied to the bottom surface 20 of the constraining substrate 22 before the base substrate 12 is brought into contact with the damping layer 16. Alternatively, the damping layer 16 may be applied to the base substrate 12 prior to bringing the constraining substrate 22 into contact with the damping layer 16.

In one embodiment, the base substrate 12 is a stamped dashboard panel wherein the opening 24 is to accommodate a steering column. In this embodiment, the constraining substrate 22 is preferably a metal blank of any suitable shape or size that has adequate lateral dimensions to provide the opening 28 therein corresponding to the size and shape of the dashboard panel opening 24. The opening 28 in the metal blank 22 is aligned in register with the opening 24 of the dashboard panel 12 as shown in FIG. 2. The resulting system 10 effectively provides a composite opening 30 to accommodate a steering column that passes through it. The resulting system 10 effectively locally stiffens the dashboard panel at the steering column opening and provides damping for the vibrations generally associated therewith.

The base substrate 12 is preferably comprised of CRS or aluminized steel, less preferably other ferrous metals such as stainless steel, tin-free steel or coated steel, less preferably of non-ferrous metals such as aluminum, and even less preferably non-metallic materials such as paper, cardboard, rigid plastics (polyethylene, polypropylene, PET, polystyrene), glass, etc. The constraining substrate 22 can be composed of any of the materials listed above with regard to the base substrate 12. It is preferred that the constraining substrate 22 be composed of aluminized steel having a lower thickness than the base substrate 12. Less preferably it can be the same material and have the same thickness as the base substrate 12. Alternatively, the base substrate 12 and constraining substrate 22 can be composed of different materials and have different thicknesses. The base substrate 12 and constraining substrate 22 each individually have a thickness of 0.005-0.5, preferably 0.007-0.25, preferably 0.008-0.01, preferably 0.009-0.08, preferably 0.01-0.06 or about 0.02, 0.03, 0.04 or 0.05, inches. In one embodiment, the system 10 comprises a base substrate 12 composed of 0.03-inch CRS, a 0002-inch thick damping layer 16 and a constraining substrate 22 composed of 0.02-inch aluminized steel.

The damping layer 16 is preferably a non-foam polyurethane layer made from of a mixture of a polyol composition and isocyanate composition without the use of a blowing agent. The polyurethane layer can also be made using catalysts and other additives such as chain extenders as known in the art. The polyol composition can be a blend comprising one or more polyols, catalysts, chain extenders and combinations thereof. The damping layer 16 has a density of 0.5-1.4, preferably 0.8-1.3, preferably 1-1.2 or about 1.05, 1.1 or 1.15 g/cm$^3$. As will be seen below, the non-foam polyurethane damping layer 16 can be made from the components described below and subsequently cured.

A suitable commercial polyol is Multranol 3900 from Bayer Corporation, which is a polyoxypropylene triol modified with ethylene oxide. Other suitable polyols that can be used in the polyol blend, or used interchangeably with Multranol 3900, include Poly bd R45HTLO from Sartomer, Krasol LBH 5000 from Kaucuk A.S., Arcol HS-100 from Bayer Corporation, Jeffamine D-2000 from Huntsman Corporation, and #1 Castor Oil from Acme-Hardesty. Poly bd R-45HTLO resin is a liquid hydroxyl-terminated polymer of butadiene, Krasol LBH 5000 is a hydroxyl-terminated liquid polybutadiene which improves the damping characteristics of the urethane layer. Of the other suitable polyols, Arcol HS-100 is a filled polyether polyol, Jeffamine D-2000 is an amine-terminated polyether with a polyoxypropylene backbone providing increased reactivity to the polyol blend, and #1 Castor Oil is a naturally occurring material that is a triglyceride of fatty acids primarily composed of 12-hydroxyoleic acid.

In a preferred embodiment, a polyol blend is used that is a mixture of at least two polyols, i.e. a first polyol and a second polyol. The first polyol has a molecular weight of 2000-8000, preferably 3000-7000, preferably 4000-6500, preferably 4500-5500 or about 4800 or 5000, and a hydroxyl number of 10-200, preferably 20-100 or preferably 30-50. The second polyol has a molecular weight of 500-4000, preferably 1500-3500, preferably 2200-3200, preferably 2600-3000 or preferably about 2700, 2800, 2900 or 3000, and a hydroxyl number of 10-200, preferably 20-100 or preferably 40-60. Most preferably, the weight ratio of the first polyol to the second polyol is 20:80 to 80:20 or preferably 35:65 to 65:35. For one damping layer 16, the first and second polyols are Multranol 3900 and Poly bd R45HTLO, respectively. Multranol 3900 available from Bayer has a molecular weight of about 4800 and a hydroxyl number of about 35. Poly bd R45HTLO available from Sartomer has a molecular weight of about 2800 and a hydroxyl number of about 47. Optionally, a preferred damping layer 16 can comprise a third polyol, preferably castor oil. The third polyol is preferably 3-15, preferably 4-12, preferably 5-8 or about 6 or 7 weight percent of the total damping layer 16 weight.

Chain extenders are isocyanate-reactive materials and generally are used to stiffen the urethane layer. Suitable commercial chain extenders are 1,4 butanediol from Chemcentral and ethylene glycol also from Chemcentral. 1,4 butanediol and ethylene glycol can be used individually, or preferably in combination, in the polyol composition. Alternatively, other chain extenders may be used, such as diethylene glycol, ethylenediamine, hydrazine, isophoronediamine, diethyltoluenediamine and methylene-bis(orthochloroaniline).

In one embodiment, the composition for producing the damping layer 16 contains at least two chain extenders, i.e. a first chain extender and a second chain extender. The first and second chain extenders are ethylene glycol and 1,4 butanediol, respectively. The first chain extender is preferably 0.1-1, preferably 0.25-0.75, and preferably 0.4-0.6 or about 0.5 weight percent of the total damping layer 16 weight. The second chain extender is preferably 1-4, preferably 1.5-3.5, and preferably 2-3 or about 2.5 weight percent of the total composition for providing the damping layer 16.

Catalysts initiate the cure between the polyol composition and isocyanate composition. Preferably, amine-based catalysts are used. A suitable commercial amine catalyst is Dabco 33-LV from Air Products (trimethylenediamine catalyst in dipropylene glycol). Alternatively, tin-based catalysts may be used or added to the amine catalysts. One suitable commercial tin-based catalysts is dibutyltin diacetate from OMG Americas. Other tin-based catalysts may be used as well. Optionally, mixtures of the above and other suitable catalysts known in the art may be also used. In one preferred embodiment, the damping layer 16 contains at least one catalyst. Preferably, the catalyst is Dabco 33-LV wherein it is preferably 0.1-1, preferably 0.25-0.75, preferably 0.4-0.6, or about 0.5, weight percent of the total damping layer 16 composition.

The isocyanate composition preferably is or includes Mondur MA2300 from Bayer Corporation. Mondur MA2300 is an allophanate-modified MDI (diphenylmethanediisocyanate) having two isocyanate reactive sites. The allophanate-modified MDI is preferred because, unlike unmodified MDI, the allophanate-modified MDI prepolymer can be a liquid at standard temperature and pressure (298K and 1 atm). This greatly simplifies processing. The allophanate-modified MDI molecule has an effective isocyanate concentration of about 20-30 weight percent, meaning that about 20-30 weight percent of the modified MDI molecule is comprised of the two isocyanate (NC=O) reactive sites per molecule. Alternatively, other MDI or TDI (toluene diisocyanate) isocyanates may be used in the composition. It is important, however, when using other isocyanate formulations to take into account their respective effective weight percent concentrations of active NC=O sites.

The index for the damping layer 16 is 70-200, preferably 90-180, preferably, 100-170, preferably 120-160 or preferably about 130 or 140 or 150 or 130-150. The damping layer 16 has a thickness of 0.001-0.05, preferably 0.001-0.02, preferably 0.001-0.008 or preferably 0.002, 0.003, 0.004 or 0.005 inches.

Most preferably, the damping layer 16 is made from a composition as shown below in table 1. In table 1, any preferred or less preferred or more preferred concentration or range of any component can be combined with any preferred or less preferred or more preferred concentration or range of any of the other components. It is not required or necessary that all or any of the concentrations or ranges come from the same column. Further, all values in table 1 are percentages by weight of the total composition for producing the damping layer 16.

TABLE 1

| Component | Most Preferred | Less Preferred | Less Preferred | Least Preferred |
|---|---|---|---|---|
| Polyol(s) | 55-58 | 50-60 | 35-75 | 10-90 |
|  | 57 | 51-59 | 40-70 | 20-85 |
|  |  |  | 45-65 | 30-80 |
| Chain Extender(s) | 2.9-3.3 | 2.5-4 | 1-5.5 | 0.1-10 |
|  | 3-3.2 | 2.7-3.6 | 1.5-5 | 0.2-8 |
|  |  | 2.8-3.4 | 2-4.5 | 0.5-6 |
| Catalyst | 0.44-0.5 | 0.34-0.75 | 0.22-2 | 0.1-5 |
|  | 0.46-0.48 | 0.38-0.6 | 0.25-1.5 | 0.15-3 |
|  |  | 0.42-0.55 | 0.3-1 | 0.2-2.5 |
| Isocyanate (having 20-30 wt % NC = O reactive sites) | 38-42 | 32-48 | 20-70 | 5-85 |
|  | 38.5 | 35-46 | 25-60 | 10-80 |
|  |  | 37-44 | 30-50 | 15-75 |

In addition to the components listed in table 1, other additives conventional in the art can be added to formulate the damping layer 16. For example, stabilizers, colorants, fillers, etc. can be added in conventional amounts. Preferably, these other additives can be added to the polyol composition as described herein prior to blending with the isocyanate composition.

Preferably, the damping layer 16 and constraining substrate 22 are adhered to a surface or vehicle body part or member subject to vibration such as base substrate 12. The peel adhesion strength (as determined using ASTM D3330) between each of the substrates 12, 22 is preferably 6-80, preferably 10-50, preferably 15-35 or preferably about 20, 25 or 30 lbs/in at a temperature of about 23° C. (±2° C.). Preferably, the damping system 10 effectively dampens vibrations at frequencies below 300 Hz. The present damping layer 16 has excellent loss factor and vibrational damping characteristics at low frequencies. The damping layer 16 has a loss factor (as determined using the Oberst Test, SAE J1637) of at least 0.05-0.35, preferably 0.08-0.3, preferably 0.1-0.25 or preferably about 0.15 or 0.2 for a vibration of 200 Hz at 15°, 23°, 30°, 45° or 60°, Celsius. Further, a damping system 10 has a cantilever stiffness (as described in Example 1 below) such that the free end will defect less than 0.2, preferably 0.15, preferably 0.13, preferably 0.11 or 0.09, inches at a temperature of about 23° C. (±2° C.) when loaded as described in the following examples.

The components for providing the damping layer 16 described herein, such as listed in table 1, are combined and mixed in a conventional manner to form the damping layer 16. As known in the art, the polyol and isocyanate should remain separate until just before they are applied to the base substrate 12 or constraining substrate 22 to produce (form) the damping layer 16. The polyols and isocyanate should be thoroughly mixed together prior to being applied to the surface of the base substrate 12 or constraining substrate 22 to form the damping layer 16. The polyol(s) and isocyanate(s) and other components can be mixed as is conventional in the art. The mixture results in a liquid damping layer 16 composition. The liquid damping composition is poured, sprayed or cast directly to the surface of the substrate 12, 22 where the damping layer 16 is to be formed. Initially, as applied to the substrate 12, 22, the damping layer composition is a free flowing liquid and substantially uncured. As discussed above, the constraining substrate 22 having the damping layer 16 composition on one side can be applied directly to the surface of the base substrate 12 to provide a sandwich structure. The amount of damping composition applied to the desired substrate 12, 22 should be approximately the amount needed to achieve the desired thickness of the damping layer 16 in order to minimize the amount of scrap.

The resulting sandwich structure can be brought to a uniform thickness by passing the structure through a constraining die having for example rollers such as nip rolls. The roller spacing may be adjusted to achieve the desired thickness of the sandwich structure. Passing the sandwich structure through the constraining die having rollers or a series of rollers assures that the damping layer 16 composition is uniformly in contact with both substrates 12, 22 and that the damping layer 16 composition is equally distributed and has a uniform thickness between the two substrates 12, 22. Alternatively, the constraining die can include other conventional processing methods used to press the sandwich structure to a uniform thickness such as applying a weight on top of the constraining layer 22.

After the sandwich structure has compressed to the desired thickness, the non-foam damping layer 16 composition is allowed to cure (without the presence of a blowing agent) to produce a fully-dense (non-cellular) polyurethane damping layer 16. Preferably, heat is used to facilitate and speed up the curing process. The sandwich structure can also be placed in an oven or hot air can be blown on it, as well as any other conventional method in order to cure the damping layer 16 composition. Alternatively, the base substrate 12 and/or the constraining substrate 22 can be preheated before the damping layer 16 composition is applied. The substrates 12, 22 can be preheated by using an oven or other appropriate method. Also, either the base substrate 12 or the constraining substrate 22 can be preheated in combination with post-heating for facilitating the curing of the damping layer 16 composition. Less preferably, the damping layer 16 composition can be allowed to cure at room temperature, which significantly increases the curing time.

The resulting damping system 10 then can be cut and/or stamped into desired shapes to suit particular applications such as passenger vehicle body parts. The damping layer 16 discussed herein provides a damping system 10 that is effective to damp vibrations in vehicle body parts, while at the same time is flexible enough to bend and form to the contour of the body parts when stamped. The continuous surface-to-surface contact between the damping layer 16 and the substrates 12, 22 maximizes the transfer of vibrations from the vibrating body panel (base substrate 12) to the damping layer 16. The damping system 10 provides increased localized stiffness to the vehicle body part at or near the source of the vibration (e.g. adjacent a moving longitudinal projection such as a steering column or axle rod) that produces or primarily contributes to the vibration. This is accomplished without increasing the density and the weight of the overall body part, which is wasteful. As seen in example 2 below, a damping system 10 can be provided whose stiffness is greater than that of a base substrate 12 alone of the same overall thickness. Further, the damping system 10 weighs less than a corresponding base substrate 12 of the same thickness and thus not only can improve stiffness but fuel economy as well. The range of materials of which the constraining substrate 22 may be composed also can reduce the cost of the damping system 10 as contrasted with a base substrate 12 of the same total thickness.

The following examples are provided by way of illustration and not limitation.

Example 1

A damping layer 16 composition having an index of 150 and as shown below in table 2 was poured onto a CRS base substrate 12 having lateral dimensions of 20 millimeters wide by 230 millimeters long and a thickness of about 0.03 inches. The damping layer 16 composition was spread over one whole surface of the base substrate 12 to about a thickness of 0.015 inches. A CRS constraining substrate 22 having lateral dimensions of 20 millimeters wide by 230 millimeters long and a thickness of about 0.03 inches was placed directly on top of the applied damping layer 16 composition. The resulting damping system 10 was placed in a machine press set at approximately 300 psi to achieve a total composite thickness of 0.075 inches. The final composite damping system was 20 millimeters wide and 230 millimeters long.

TABLE 2

| Component | Description | Weight Percent |
| --- | --- | --- |
| Multranol 3900 | Polyol | 32.3 |
| Krasol LBH 5000 | Polyol | 19.38 |
| Ethylene Glycol | Chain Extender | 0.52 |
| Castor Oil | Polyol | 6.2 |
| 1,4 Butanediol | Chain Extender | 2.58 |
| Dabco 33-LV | Catalyst | 0.47 |
| Mondur MA2300 | Isocyanate | 38.55 |

The damping layer 16 of the resulting composite damping system was allowed to cure for a 24-hour period at approximately 25° C. After the 24-hour curing period, the composite was tested for peel adhesion strength and stiffness. Peel adhesion strength was measured as 35 lbs/inch at about 23° C. (±2° C.) using the ASTM D3330 test method by clamping the base substrate 12 portion of the composite damping system in a fixed position so as to lock the base substrate portion in place and subsequently pulling the constraining substrate 22 portion upward at a rate of 12 inches per minute and measuring the force (lbs/in) once the base substrate 12 and constraining substrate 22 begin to separate. The stiffness was measured by cantilevering the composite structure such that one of the 20-millimeter wide edges of the composite damping system was secured by a clamp in a fixed position with the other three edges being free. A 100-gram weight was placed on the free 20-millimeter edge at a distance of about 230 millimeters opposite the fixed end. The resulting vertical displacement of the free 20-mm edge was 0.09 inches.

The vibration damping performance of the composite was measured using the Oberst test (SAE J1637) as known in the art. Essentially, the Oberst test comprises vibrating a cantilevered steel bar having a damping material bonded thereon at a specific frequency and temperature and measuring the damping performance that is expressed in terms of composite loss factor. The loss factor for the above-described composite damping system was interpolated at 200 Hz at the temperatures shown in table 3.

TABLE 3

| Temperature (° C.) | Loss Factor |
| --- | --- |
| 15 | 0.09 |
| 23 | 0.11 |
| 30 | 0.14 |
| 45 | 0.19 |
| 60 | 0.16 |

Example 2

A damping layer 16 composition having an index of 120 and as shown below in table 4 was sprayed onto a CRS constraining substrate 22 having lateral dimensions of 20 millimeters wide by 230 millimeters long and about 0.03 inches thick. The damping layer 16 composition was sprayed over one whole surface of the constraining substrate 22 to about a thickness of 0.062 inches. A CRS base substrate 12 having lateral dimensions of 20 millimeters wide by 230 millimeters long and a thickness of about 0.03 inches was placed directly on the applied damping layer 16 composition (i.e. as applied onto the constraining substrate 22). The resulting damping system 10 was placed in a machine press set at approximately 300 psi to achieve a total composite thickness of 0.062 inches. The damping layer 16 had a thickness of 0.002 inches. The final composite damping system was 20 millimeters wide and 230 millimeters long.

TABLE 4

| Component | Description | Weight Percent |
| --- | --- | --- |
| Multranol 3900 | Polyol | 32.3 |
| Poly bd R45HTLO | Polyol | 19.38 |
| Ethylene Glycol | Chain Extender | 0.52 |
| Castor Oil | Polyol | 6.2 |
| 1,4 Butanediol | Chain Extender | 2.58 |
| Dabco 33-LV | Catalyst | 0.47 |
| Mondur MA2300 | Isocyanate | 38.55 |

The damping layer 16 of the resulting damping system was allowed to cure for a 24-hour period at approximately 25° C.

After the 24-hour curing period, the composite was tested for peel adhesion strength and stiffness as in Example 1. Peel adhesion strength was measured as 20 lbs/inch at about 23° C. (±2° C.). The vertical displacement of the free 20-mm edge in the cantilever stiffness test as described in Example 1 was 0.11 inches at about 23° C. (±2° C.). To compare the stiffness of the this damping system 10 to that of body panel of the same total thickness, a piece of 0.062-inch thick CRS measuring 20 mm×230 mm was tested using the same cantilever method. The 0.062-inch thick piece of CRS had a vertical displacement of 0.152 inches at the free 20-mm edge under identical test conditions. Thus, it was observed that the present composite damping system 10 of this example is stiffer than a piece of CRS of equal total thickness and dimensions at the same testing conditions.

While the invention has been described with reference to preferred embodiments, it will be understood that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiments disclosed herein, but that the invention will include all embodiments falling within the scope and spirit of the invention as set forth in the appended claims.

What is claimed is:

1. A damping system comprising a vehicle body part as a base substrate, a non-foam vibration damping layer overlying and in contact with said base substrate, and a constraining substrate overlying and in contact with said damping layer, said base substrate having lateral dimensions greater than said constraining substrate, said damping system exhibiting a peel adhesion strength of at least 20 lbs/in. at the point the base substrate and the constraining substrate begin to separate from one another as measured at about 23° C. according to ASTM D3330.

2. The damping system according to claim 1, said damping layer being formulated from a composition comprising 10-90 weight percent polyol, 5-85 weight percent isocyanate, said polyol comprising a first polyol having a molecular weight of 2000-8000 and a second polyol having a molecular weight of 500-4000.

3. The damping system according to claim 2, said first and second polyols being present in said composition in a weight percent ratio of 35:65 to 65:35.

4. The damping system according to claim 1, said damping layer being formulated from a composition comprising 10-90 weight percent polyol, 5-85 weight percent isocyanate, 0.1-10 weight percent chain extender and 0.1-5 weight percent catalyst.

5. The damping system according to claim 4, said catalyst comprising an amine catalyst.

6. The damping system according to claim 4, said chain extender comprising first and second chain extenders, each being selected from the group comprising 1,4 butanediol, ethylene glycol, diethylene glycol, ethylenediamine, hydrazine, isophoronediamine, diethyltoluenediamine, methylene-bis(orthochloroaniline), or combinations thereof.

7. The damping system according to claim 1, said base substrate having a thickness of 0.005-0.5 inches.

8. The damping system according to claim 1, said constraining substrate having a thickness of 0.005-0.5 inches.

9. The damping system according to claim 1, said damping layer being a polyurethane layer having a thickness of 0.001-0.05 inches and an index of 130-150.

10. The damping system according to claim 9, said damping layer having a loss factor of at least 0.09 for a vibration of 200 Hz at about 23° C. and a density of 1-1.2 g/cm$^3$.

11. The damping system according to claim 1, said system having a cantilever stiffness such that a section of said system measuring 20 mm wide by 230 mm long and having a thickness of about 0.062-0.075 in., when fixed at one 20-mm edge, at 23° C. will be displaced less than 0.2 inches at its free 20-mm edge, opposite the fixed edge, when a 100-gram weight is suspended from the free 20-mm edge.

12. The damping system according to claim 1, said non-foam vibration damping layer and said constraining substrate having substantially the same lateral dimensions.

13. The damping system according to claim 1, said vehicle body part being metal and having a first opening therein effective to accommodate a linkage or other structure extending, or that is to extend, through said body part.

14. The damping system according to claim 13, said constraining substrate having a second opening therein, said base and constraining substrates being aligned so that said first and second openings are provided substantially in register, thereby defining a composite opening through said damping system comprising said registered first and second openings.

15. The damping system according to claim 14, said vibration damping layer having a third opening therein and being further aligned so that said third opening is provided substantially in register with said first and second openings, such that said composite opening in said damping system is provided and defined by the registered first, second and third openings provided in the respective layers thereof.

16. The damping system according to claim 14, said vehicle body part being selected from the group consisting of a dashboard panel and a wheel hub panel.

17. The damping system according to claim 16, said linkage comprising a steering column.

18. The damping system according to claim 16, said linkage comprising an axle rod.

19. The damping system according to claim 1, said damping layer being in substantially continuous surface-to-surface contact with each of said base and constraining substrate layers over the respective interfacial surfaces thereof.

20. A damping system comprising a metal vehicle body part having a non-foam polyurethane damping layer having a thickness of 0.001-0.05 inches overlying and in substantially continuous contact with said vehicle body part, wherein said damping layer has a loss factor of at least 0.09 for a vibration of 200 Hz at about 23° C.

21. The damping system according to claim 20, further comprising a metal constraining substrate substantially in contact with said non-foam polyurethane damping layer, said vehicle body part having lateral dimensions greater than said constraining substrate.

* * * * *